(12) United States Patent
Naganuma et al.

(10) Patent No.: US 8,165,601 B2
(45) Date of Patent: Apr. 24, 2012

(54) POSITIONAL INFORMATION SYSTEM

(75) Inventors: Ken Naganuma, Yokohama (JP); Eriko Ando, Yokohama (JP); Yusuke Mishina, Kunitachi (JP); Takayoshi Fujioka, Narashino (JP)

(73) Assignee: Hitachi, Ltd., Tokyo (JP)

( * ) Notice: Subject to any disclaimer, the term of this patent is extended or adjusted under 35 U.S.C. 154(b) by 58 days.

(21) Appl. No.: 12/862,065

(22) Filed: Aug. 24, 2010

(65) Prior Publication Data

US 2011/0201359 A1    Aug. 18, 2011

(30) Foreign Application Priority Data

Feb. 17, 2010 (JP) .................. 2010-032434

(51) Int. Cl.
*H04W 24/00* (2009.01)
(52) U.S. Cl. ............ 455/456.1; 455/16; 455/422.1
(58) Field of Classification Search ............... 455/456.1
See application file for complete search history.

(56) References Cited

OTHER PUBLICATIONS

Quasi-Zenith Satellite System Navigation Service, Interface Specification for QZSS(IS•QZSS), V 1.1, Japan Aerospace Exploration Agency, Jul. 31, 2009, URL: <http//qzss.jaxa.jp/is-qass/index_e.html>.
U.S. Appl. No. 12/865,315, filed Jul. 29, 2010, by Yusuke Mishina.

*Primary Examiner* — Nick Corsaro
*Assistant Examiner* — Isaak R Jama
(74) *Attorney, Agent, or Firm* — Mattingly & Malur, PC

(57) ABSTRACT

In an indoor positioning system, for establishment of a cost sharing system, the positioning information transmission device does not directly transmit positional information but performs concealment and variablization on the device ID and transmits the concealed and variablized device ID. The positioning information management server stores and manages correspondence between the device IDs and positional information, and performs conversion from the device ID to the positional information in accordance with the correspondence. Further, the problem of conflict between concealed IDs upon concealment of positioning identification information by the positioning information transmission devices, which occurs when all the positioning information transmission devices use the same secret key, can be prevented. The system can be operated even when the bit length of the device ID is short.

9 Claims, 15 Drawing Sheets

HARDWARE CONFIGURATION OF POSITIONING INFORMATION MANAGEMENT SERVER

PROCESSING FLOW IN TIME ID GENERATION UNIT

PROCESSING FLOW IN CONCEALED ID GENERATION UNIT

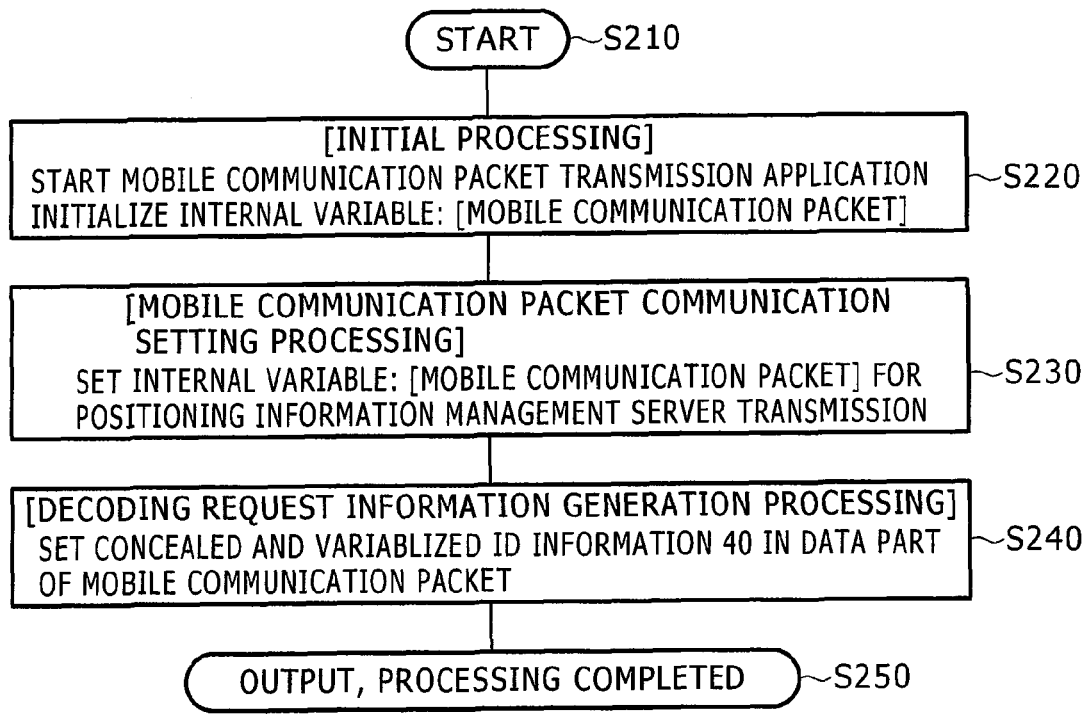

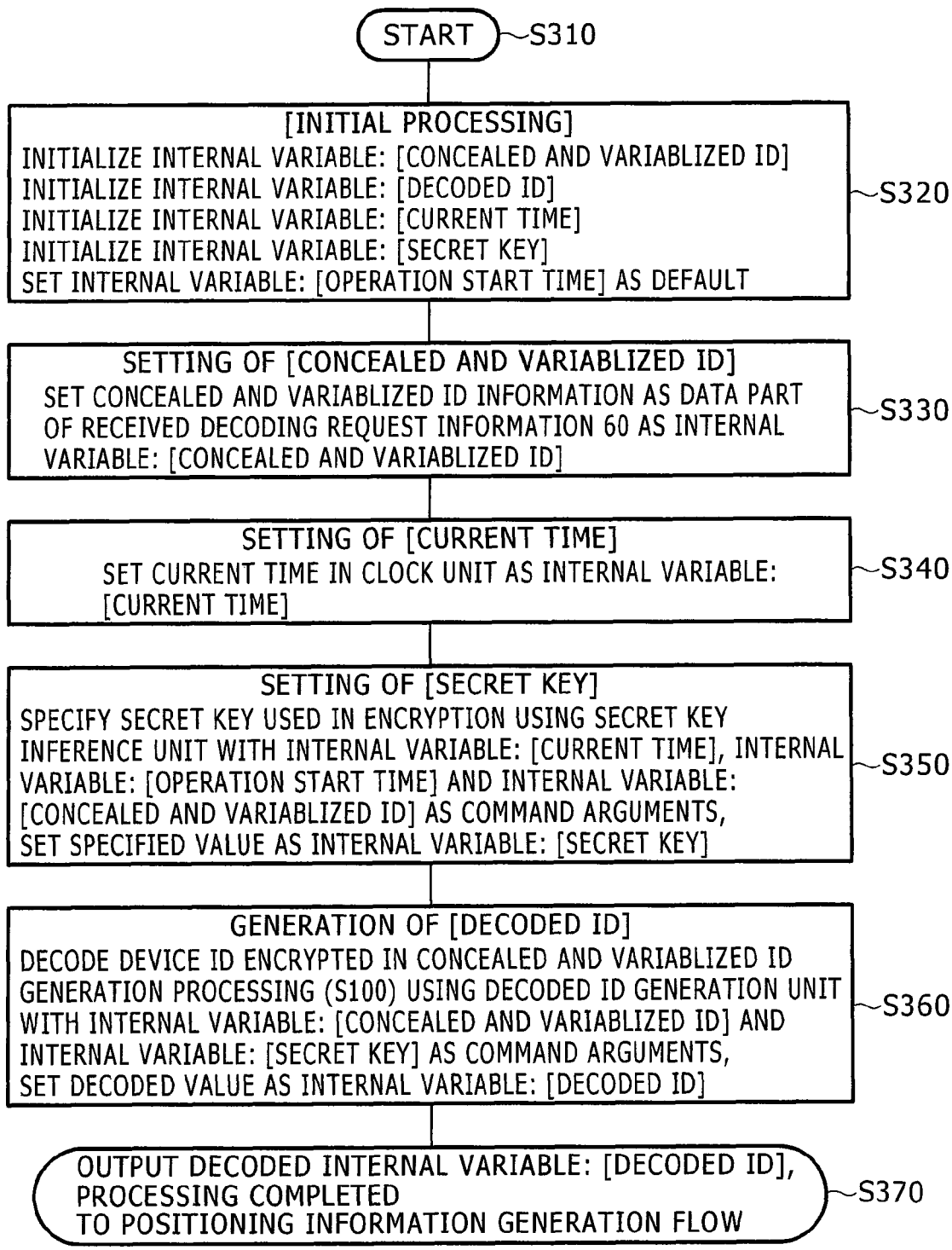

FIG.11

PROCESSING FLOW IN SECRET KEY INFERENCE UNIT OF POSITIONING INFORMATION MANAGEMENT SERVER 30

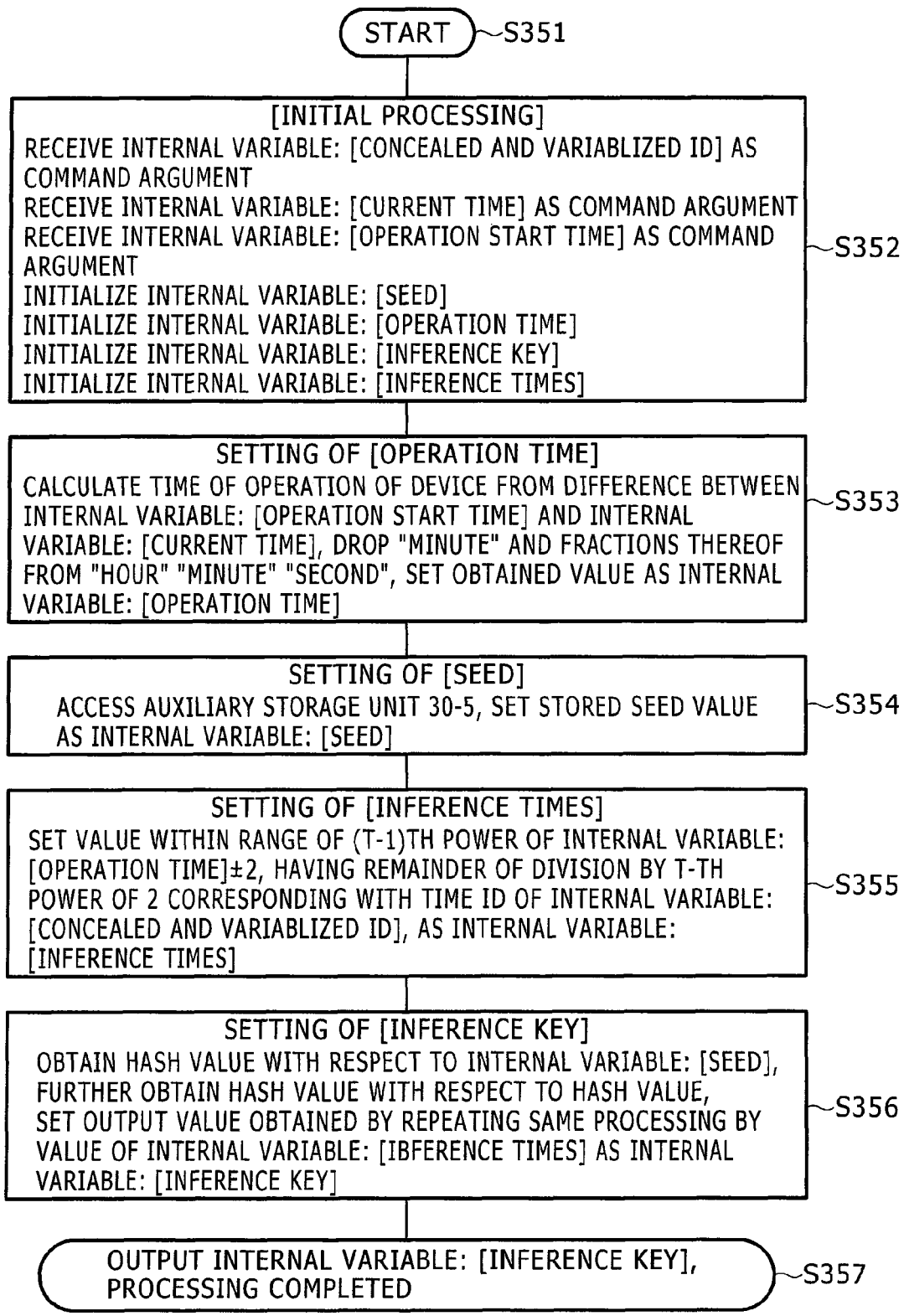

START — S351

[INITIAL PROCESSING]
RECEIVE INTERNAL VARIABLE: [CONCEALED AND VARIABLIZED ID] AS COMMAND ARGUMENT
RECEIVE INTERNAL VARIABLE: [CURRENT TIME] AS COMMAND ARGUMENT
RECEIVE INTERNAL VARIABLE: [OPERATION START TIME] AS COMMAND ARGUMENT
INITIALIZE INTERNAL VARIABLE: [SEED]
INITIALIZE INTERNAL VARIABLE: [OPERATION TIME]
INITIALIZE INTERNAL VARIABLE: [INFERENCE KEY]
INITIALIZE INTERNAL VARIABLE: [INFERENCE TIMES] — S352

SETTING OF [OPERATION TIME]
CALCULATE TIME OF OPERATION OF DEVICE FROM DIFFERENCE BETWEEN INTERNAL VARIABLE: [OPERATION START TIME] AND INTERNAL VARIABLE: [CURRENT TIME], DROP "MINUTE" AND FRACTIONS THEREOF FROM "HOUR" "MINUTE" "SECOND", SET OBTAINED VALUE AS INTERNAL VARIABLE: [OPERATION TIME] — S353

SETTING OF [SEED]
ACCESS AUXILIARY STORAGE UNIT 30-5, SET STORED SEED VALUE AS INTERNAL VARIABLE: [SEED] — S354

SETTING OF [INFERENCE TIMES]
SET VALUE WITHIN RANGE OF (T-1)TH POWER OF INTERNAL VARIABLE: [OPERATION TIME]±2, HAVING REMAINDER OF DIVISION BY T-TH POWER OF 2 CORRESPONDING WITH TIME ID OF INTERNAL VARIABLE: [CONCEALED AND VARIABLIZED ID], AS INTERNAL VARIABLE: [INFERENCE TIMES] — S355

SETTING OF [INFERENCE KEY]
OBTAIN HASH VALUE WITH RESPECT TO INTERNAL VARIABLE: [SEED], FURTHER OBTAIN HASH VALUE WITH RESPECT TO HASH VALUE, SET OUTPUT VALUE OBTAINED BY REPEATING SAME PROCESSING BY VALUE OF INTERNAL VARIABLE: [IBFERENCE TIMES] AS INTERNAL VARIABLE: [INFERENCE KEY] — S356

OUTPUT INTERNAL VARIABLE: [INFERENCE KEY], PROCESSING COMPLETED — S357

PROCESSING FLOW IN DECODED ID GENERATION UNIT OF POSITIONING INFORMATION MANAGEMENT SERVER 30

FIG.14

POSITIONAL INFORMATION CORRESPONDENCE TABLE (D300)

| DEVICE ID | POSITIONAL INFORMATION |
|---|---|
| 1234 | LATITUDE XX   LONGITUDE YY   HEIGHT ZZ |
| 5678 | LATITUDE xx   LONGITUDE yy   HEIGHT zz |
| .... | .... |

CONCEALED AND VARIABLED ID PREVIOUSLY SUPPLIED TO POSITIONING INFORMATION TRANSMISSION DEVICE

| OPERATION TIME \ DEVICE ID | 1 | 2 | 3 | 4 | ... |
|---|---|---|---|---|---|
| 1 | qwr | jwb | asw | wew | ... |
| 2 | dsf | dfa | yuw | tvw | ... |
| 3 | kdn | zxm | pwn | Mdx | ... |
| 4 | oel | mdo | zaw | Lge | ... |
| 5 | pwk | azo | abc | csw | ... |
| 6 | nes | akw | zzq | dgr | ... |
| 7 | sda | trs | weq | fgg | ... |
| ... | ... | ... | ... | ... | ... |

$2^{(T-1)}$ spans rows 3–4; $2^{(T-1)}$ spans rows 6–7.

D400

OTHER DEVICES DO NOT TRANSMIT ABC DURING OPERATION TIME OF $\pm 2^{(T-1)}$

T=2 HOLDS IN THIS FIGURE

POSITIONAL INFORMATION SYSTEM

BACKGROUND OF THE INVENTION

The present invention relates to a positional information system including an indoor positioning system complementary to the Global Positioning System (GPS).

Among positioning systems using electric waves, the most widely used system is the Global Positioning System (hereinbelow, referred to as "GPS"). In the GPS, utilizing GPS positioning signals transmitted from about 30 satellites on orbits around the earth, the positional relation between a receiver and the GPS satellite is measured, and the latitude, longitude and height of a current position are calculated. In the GPS, as a positioning signal from the satellite is used, positioning in indoor and underground space cannot be performed.

On the other hand, the Indoor Messaging System (IMES) using a positioning information transmission device for indoor positioning and a ground complementary signal is a positioning system to enable indoor positioning (see "Quasi-Zenith Satellite System Navigation Service Interface Specification for QZSS(IS-QZSS)" V1.1 Japan Aerospace Exploration Agency, Jul. 31, 2009 URL<http//qzss.jaxa.jp/is-qzss/index_e.html>). The ground complementary signal (IMES signal) uses the same message structure as that of a satellite positioning signal. In this system, in place of satellite orbit data (navigation message), positional information indicating the installation site of the positioning information transmission device is transmitted. Unlike general GPS positioning, the positioning by reception of the IMES signal is an extremely simple and easy positioning method because the position can be specified by merely decoding/decrypting positional information indicating the installation site of the positioning information transmission device superimposed on the IMES signal. According to this method, indoor positioning can be realized by very small-scale modification even with existing GPS receivers or various terminals with GPS reception function. By virtue of such high interoperability with the satellite positioning, the indoor positioning system using the positioning information transmission device for indoor positioning and the ground complementary signal attracts attention as a promising system and is the focus of research and development.

SUMMARY OF THE INVENTION

In the indoor positioning system (IMES) using the positioning information transmission device for indoor positioning and the ground complementary signal, since the positioning method, equipment and materials and operation are different from those in the satellite positioning system, there are problems as follows.

(1) Problem in Infrastructural Costs

Unlike the Global Positioning System (GPS) utilizing positioning signals transmitted from positioning satellites launched for military purposes by the United States of America, in the IMES, private investment is required to install the positioning information transmission device to transmit the ground complementary signal. Various stake holders such as a facility owner, an IMES infrastructural service provider, a mobile communication business establishment (carrier), a service provider and a service user are involved in a positioning information service using the IMES. The issue as to who burdens the costs for equipment installation and operation is an important problem in propagation of the IMES.

(2) Problem in Concealment and Variablization of Ground Complementary Signal

In the above-described "(1) Problem Infrastructural Costs", it may be arranged such that only the server owned by the IMES infrastructural service provider can decode the ground complementary signal transmitted from the positioning information transmission device by changing the signal to its device ID from the positioning information on the installation site of the device, further concealing the ID, and changing the concealed ID at predetermined intervals (ID concealment and variablization). With this countermeasure, since the service user makes an inquiry to the IMES infrastructural service provider so as to obtain the positional information corresponding to the ground complementary signal, a pay-per-use basis charging system can be realized. The fees collected from the users are used for payment for the service provider who bore the equipment installation/operation costs. Further, since a third person who has no contract regarding use of the IMES infrastructural service cannot convert the ground complementary signal to the positional information without difficulty, disbenefit to the infrastructural cost bearer by unauthorized use of the IMES infrastructure can be prevented.

However, the communication speed of the ground complementary signal is low (50 bps), and time from the capture of the signal by a service user, who is walking, within a signal-receivable cell, to the completion of signal reception is limited. Accordingly, it is necessary to reduce the bit length of the concealed and variablized ID of the device as the ground complementary signal as much as possible. In this case, there is a possibility that upon concealment and variablization on a short bit-length ground complementary signal, concealed and variablized IDs accidentally coincide with each other between different devices and decoding becomes impossible on the server side. For example, when 1000 devices generate 20-bit concealed and variablized IDs at random, the probability of ID coincidence between different devices and decoding failure is about 50%. When the ID decoding cannot be performed, the positional information cannot be supplied to the service user, and the infrastructural cost bearer loses the opportunity of charging. Further, the infrastructural cost bearer may lose the service user's credibility with the IMES infrastructure.

The present invention has been made to address the above-described problems and to promote wide use of the indoor positioning system, and provides a configuration of an indoor positioning system having a positioning information transmission device to transmit a ground complementary signal as a positioning signal for indoor positioning, a mobile communication terminal having a positioning reception function to receive the ground complementary signal and a client function of application utilizing positional information e.g. a cellular phone with a GPS positioning function, and a positioning information management server to manage correspondence between ground complementary signals and positional information, and an operation technique for the system.

The present invention has been made in consideration of the above problems, and regarding the above-described "(1) Problem Infrastructural Costs", by changing a ground complementary signal (hereinbelow, referred to as a "positioning information") transmitted from the positioning information transmission device to the ID of the device from the positional information, and further concealing the ID and changing the concealed ID at predetermined intervals, authorizes a positioning information management server owned by an IMES infrastructural service provider (hereinbelow, referred to as a "positioning information service provider") to enable decoding.

With this arrangement, it is possible to prevent the problem of unauthorized conversion from positioning information to positional information by a third person who has no service use contract by generating a table of correspondence between the positioning information and positional information. Further, since it is necessary for a normal service user to make an inquiry to the positioning information management server to obtain positional information from the positioning information, pay-per-use basis charging can be realized.

Regarding the above-described (2) "Problem in Concealment and Variablization of Ground Complementary Signal", the problem of accidental coincidence of concealed and variablized IDs between different devices can be solved by using the same secret key at the same time upon concealment and variablization of device IDs by all the positioning information transmission devices. Further, the ID variablization can be realized by changing a secret key to be used at predetermined intervals by all the devices in synchronization with each other. That is, the respective positioning information transmission devices perform ID concealment and variablization not by changing the IDs of the positioning information transmission devices but by changing the secret key for concealment of the IDs at predetermined intervals. By encryption of different device IDs with the same secret key by all the positioning information transmission devices, the problem of ID conflict can be solved.

At this time, as the device ID is plain text inputted with respect to an encryption function, its bit length may be an arbitrary length upon use of e.g. stream cipher as the encryption function. Further, in the positioning information transmission device, by adding a time ID uniquely determined from the device current time to the ID to be transmitted, the secret key used in concealment can be specified even upon occurrence of shift between time of generation of a concealed and variablized ID and decoding start time by the positioning information management server or upon off-state of an internal clock of the positioning information transmission device. For example, in the following embodiment, assuming that the bit length of time ID is T, the allowable time shift is within time of $2^{\wedge}(T-1)\times(ID$ change interval) in the internal clock of the positioning information transmission device. Further, as the time ID is not concealed, attack by inference of device ID from the time ID is considered. In the following embodiment, however, the inference of device ID from time ID can be prevented by concealment of a region including the device ID and the time ID.

That is, to establish a cost sharing system, the present invention provides a positioning information system using the positioning information transmission device, in which the positioning information transmission device does not transmit positional information but transmits a concealed and variablized ID as a concealed and variablized device ID for positioning, the positioning information management server holds and manages correspondence between the device IDs and positional information. The positioning information management server performs conversion to positional information in accordance with the correspondence in response to a decoding request with a concealed and variablized ID and provides the positional information.

In this manner, since the conversion of positioning identification information transmitted from the positioning information transmission device to positional information is performed via the positioning information management server, it is possible for the positioning information management server to grasp the positioning information transmission device that transmitted the positioning identification information and its installation site, the mobile communication terminal that received the identification information and issued the request for conversion to positional information. As a result, it is possible to generate charging information such that in accordance with the number of use of the positioning identification information, the region owner in the installation site, the user of the mobile communication terminal, and the application provider who provides a service in connection with the positional information share the installation and operation costs of the positioning information system. Further, by updating positioning identification information transmitted from the positioning information transmission device at predetermined intervals, the positioning information management server can perform conversion from the positioning identification information to the positional information, but a third person who has no service contract cannot decipher the positioning identification information without difficulty.

Further, according to the present invention, upon concealment and variablization of device IDs, the respective devices use the same secret key at the same time, accordingly, the IDs concealed at the same time among the different positioning information transmission devices do not coincide. Further, by adding a time ID uniquely determined from current time in the internal clock of the positioning information transmission device to the ID transmitted from the positioning information transmission device, with use of the time ID and the secret key linked to the time ID by the server in decoding, even when IDs concealed by different positioning information transmission devices at different times coincide with each other, decoding is possible by identification of time ID. In the following embodiment, assuming that the bit length of time ID is T, the allowable time shift is within time of $2^{\wedge}(T-1)\times(ID$ change interval) in the internal clock of the positioning information transmission device.

According to one aspect of the present invention, provided is a positioning information system including:

a plurality of positioning information transmission devices, installed in a region having a predetermined extent, each of which transmits unique positioning identification information; a mobile communication terminal with positioning function having a mobile communication radio communication unit to receive the transmitted positioning identification information and transmit the received positioning identification information as mobile communication radio information; and a positioning information management server that reads the positioning identification information from the transmitted mobile communication radio information, converts the positioning identification information into position identification information representing a predetermined installation point, and returns the converted position identification information as mobile communication radio information to the mobile communication terminal with positioning function, wherein the positioning information system allocates position identification information unique to the point to the predetermined installation point, and allocates transmission device-specific transmission device fixed identification information to the positioning information transmission device, wherein the positioning information transmission device holds the transmission device fixed identification information, performs concealment processing on predetermined transmission device fixed identification information to conceal the transmission device fixed identification information stored in the positioning information transmission device itself, generates concealed variable identification information, and generate concealed key identification information with respect to the concealment processing, and generates the positioning identification information including the concealed variable identification information and the concealed key identification information and transmits the generated positioning identification information, wherein the positioning information management server, having a position identification information correspondence table describing correspondence between the transmission device fixed identification information of the positioning information transmission device and the position identification information, reads the concealed variable identification information and the concealed key identification information from the positioning identification information received from the positioning information transmission device, performs decoding processing on the concealed variable identification information using the read concealed key identification information, decodes the transmission device-specific transmission device fixed identification information, makes retrieval in the position identification information correspondence table, and performs conversion to the position identification information linked to the decoded transmission device fixed identification information, wherein the positioning information transmission device repeats generation and transmission of the positioning identification information, and wherein the positioning information management server repeats decoding of the transmitted positioning identification information.

Further, in the above-described aspect, it may be arranged such that the concealed variable identification information is cipher text calculated with a common key encryption function, with a hash value, calculated by repeating inputting secret key generation seed information stored in the positioning information transmission device into a hash function to calculate a hash value and further inputting the calculated hash value into the hash function to calculate a hash value, as a secret key, and with the transmission device-specific transmission device fixed identification information as plain text, wherein the number of times of repeated hash value calculation with respect to the secret key generation seed information is a quotient upon division of operation time as a difference between actuation start time to actuate and start operation of the positioning information transmission device and current time by a predetermined first time interval.

Further, in the above-described aspect, it may be arranged such that the concealed key identification information is a remainder upon division of a quotient, upon division of the operation time as the difference between the actuation start time to actuate and start operation of the positioning information transmission device and the current time by the predetermined first time interval, by a predetermined second interval, wherein the secret key generation seed information is common information for all the positioning information transmission devices installed in the region having the predetermined extent and the positioning information management server, and wherein the actuation start time is common information for all the positioning information transmission devices installed in the region having the predetermined extent and the positioning information management server.

Further, in the above-described aspect, it may be arranged such that the decoding processing on the concealed variable identification information is processing of generating plain text calculated with the common key encryption function, with a hash value calculated by repeating inputting the secret key generation seed information stored in the positioning information management server into the hash function to calculate a hash value and further inputting the calculated hash value into the hash function to calculate a hash value, as a secret key, and with the concealed variable identification information as cipher text, and wherein the number of times of repeated hash value calculation with respect to the secret key generation seed information is a value obtained by calculating a quotient upon division of a quotient, upon division of the operation time as the difference between the actuation start time stored in the positioning information management server and the current time by the predetermined first time interval, by a predetermined second time interval, then calculating a product between the calculated quotient and the second time interval, and adding the concealed key identification information to the calculated product.

Further, in the above-described aspect, it may be arranged such that the concealed variable identification information is cipher text calculated with the common key encryption function, with a bit stream, obtained by generating a random number having a predetermined bit length, with a quotient upon division of the operation time as a difference between the actuation start time to actuate and start operation of the positioning information transmission device and the current time by a predetermined first time interval, as an input, using a random number generator held in the positioning information transmission device, as the secret key, and with the transmission device-specific transmission device fixed identification information as plain text.

Further, in the above-described aspect, it may be arranged such that the concealed key identification information is a remainder upon division of a quotient, upon division of the operation time as the difference between the actuation start time to actuate and start operation of the positioning information transmission device and the current time by the predetermined first time interval, by a predetermined second time interval, and wherein the actuation start time is common information for all the positioning information transmission devices installed in the region having the predetermined extent and the positioning information management server.

Further, in the above-described aspect, it may be arranged such that the decoding processing on the concealed variable identification information is processing of generating plain text calculated with the common key encryption function, with a bit stream, obtained by generating a random number having a predetermined bit length with a value, obtained by calculating a quotient upon division of a quotient, upon division of the operation time as the difference between actuation start time held in the positioning information management server and the current time by the predetermined first time interval, by the second time interval, and calculating a product between the calculated quotient and the second time interval, and adding the concealed key identification information to the calculated product, as an input, using a random number generator held in the positioning information management server, as the secret key, and with the concealed variable identification information as the cipher text.

According to the present invention, it is possible to realize wide use of an indoor positioning system.

BRIEF DESCRIPTION OF THE DRAWINGS

FIG. 9 illustrates by example a decoding request information generation processing (S200) flow in the cellular phone 20 with positioning function;

FIG. 10 illustrates by example a decoding processing (S300) flow in the positioning information management server 30;

FIG. 11 illustrates by example a processing flow in a secret key inference unit of the positioning information management server 30;

FIG. 14 illustrates by example contents of a positional information correspondence table (D300); and FIG. 15 illustrates by example a concealed and variablized ID previously supplied to the positioning information transmission device 10.

DETAILED DESCRIPTION OF THE PREFERRED EMBODIMENTS

Figure 1:
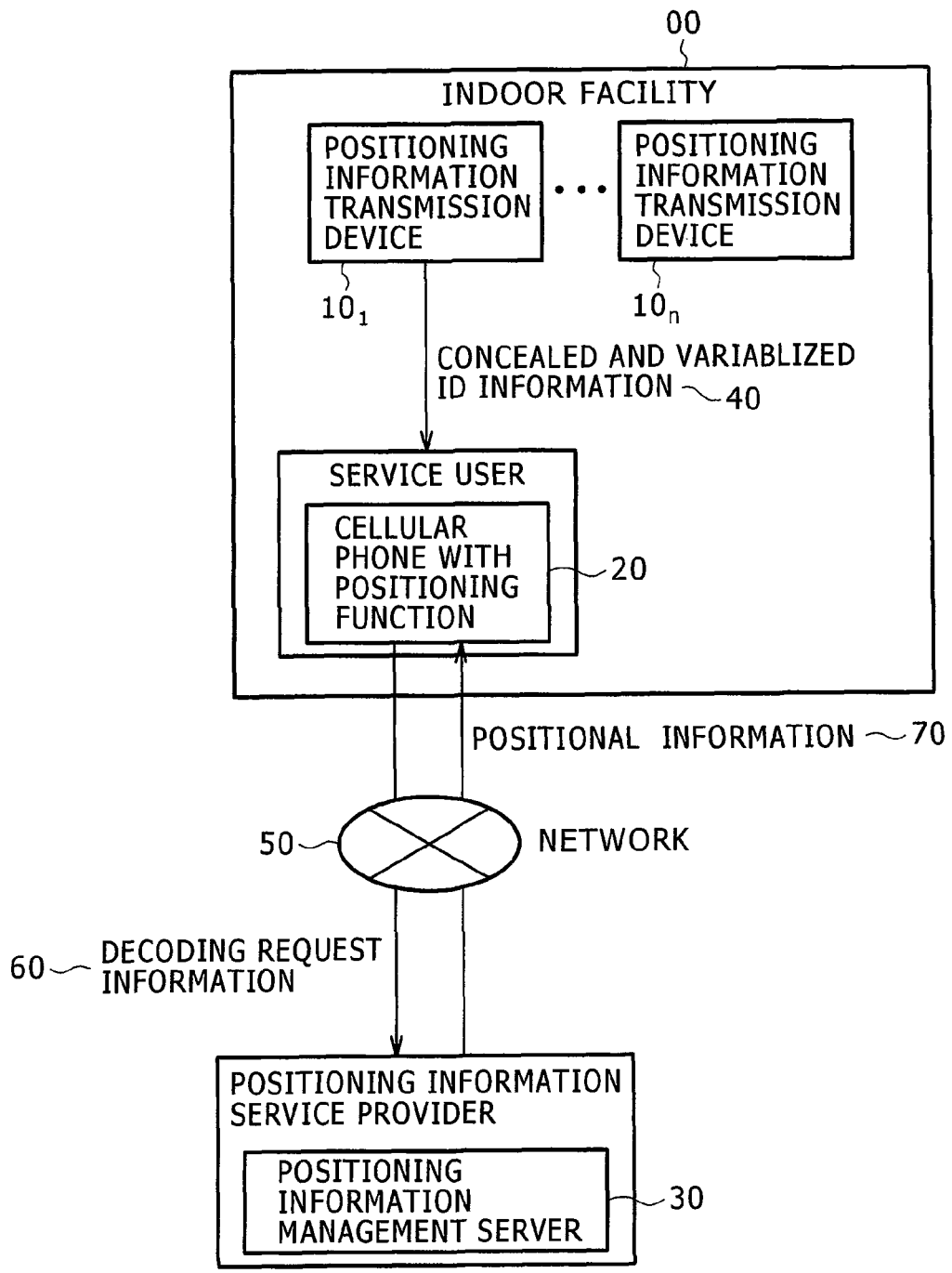
FIG. 1 illustrates by example a configuration of a first embodiment of a positioning system.

Hereinbelow, a preferred embodiment of the present invention will now be described with reference to the accompanying drawings. Note that the present invention is not limited to this embodiment.

The terms used in the present embodiment will be defined.
(1) "Positional information" means information on the latitude, longitude and height of a site in which a positioning information transmission device is installed, or address and/or place name of the installation site or popular name of the site.
(2) "Device ID" means a bit stream having a unique length P (P is an arbitrary integer equal to or greater than "1") for identification of the device which is supplied to each device upon manufacture of the device.
(3) "Time ID" means a bit stream having a length T (T is an arbitrary integer equal to or greater than "1") generated by using a time ID generation unit with current time and device operation start time as command arguments. The time ID generation unit will be described using FIG. 7.
(4) "Concealed ID" means a bit stream having a length P (P is an arbitrary integer equal to or greater than "1") generated by using a concealed ID generation unit with the current time, the operation start time and the device ID as command arguments. The concealed ID generation unit will be described using FIG. 8.
(5) "Operation start time" is operation start time of the present positioning information system written in an auxiliary storage unit in the device upon start of operation of the positioning information transmission device. The same operation start times is written in all the devices.
(6) "Seed value" is a fixed length bit stream written in a tamper resistant storage device in the device upon operation start of the positioning information transmission device. The same value is written in all the positioning information transmission devices.
(7) "Hash function" is a generic term of functions having unidirectionality, conflict resistance and randomness (example: SHA256 and SHA1). The present embodiment is not limited to use of a particular hash function.
(8) "Common key encryption method" means a stream encryption method of, with respect to an inputted secret key and plain text, outputting cipher text having the same length as that of the plain text, and with respect to input of the secret key and the cipher text, outputting the original plain text. The bit lengths of the plain text and the cipher text are arbitrary, and the bit length of the secret key is a fixed value. When the length of the bit stream used as the secret key is equal to or longer than the fixed value, some bits are dropped so as to reduce the bit length to the length of the secret key. When the length of the bit stream used as the secret key is shorter than the fixed value, padding is performed on a predetermined bit stream, to adjust the bit length to the length of the secret key.
(9) "Mobile communication packet" means a communication packet used upon communication between a mobile communication terminal and a positioning information management server by utilizing a network owned by a mobile communication service provider (carrier). In the present embodiment, a conventional cellular phone network is utilized in communication using the mobile communication packet.
(10) "Positional information table" means a table describing correspondence between device ID of the positioning information transmission device and positional information, stored and managed by the positioning information management server.
(11) "Inference key" means an inference value of the secret key, used by the positioning information transmission device for concealment of the device ID, in a secret key inference unit called by the positioning information management server in decoding processing on a concealed and variablized ID.
(12) "Inference times" is an internal variable utilized upon inference of the secret key used by the positioning information transmission device in concealment of the device ID in the secret key inference unit called in the decoding processing on the concealed and variablized ID by the positioning information management server. More particularly, it is an inference value of the number of times of application of the hash function in generation of the secret key by the positioning information transmission device.

FIG. 1 shows a configuration of an indoor positioning information system to which an embodiment of the present invention is applied. As shown in FIG. 1, in the indoor positioning information system according to the present embodiment, plural positioning information transmission devices $10_1$ to $10_n$ (hereinbelow, simply referred to as a "positioning information transmission device 10") are installed in an indoor facility 00, to transmit concealed and variablized ID information 40 as positioning identification information to a cellular phone 20 with positioning function owned by a service user.

The cellular phone 20 with positioning function receives the concealed and variablized ID information 40 transmitted from the positioning information transmission device 10, and transmits decoding request information 60 via a network 50 to a positioning information management server 30 owned by a positioning information service provider.

The positioning information management server 30 receives the decoding request information 60 transmitted from the cellular phone 20 with positioning function, converts the decoding request information into positional information 70 corresponding to the decoding request, and transmits the positional information 70 to the cellular phone 20 with positioning function held by the service user.

Next, hardware configurations of respective devices and terminal in the present embodiment will be described using FIGS. 2 to 4.

Figure 2:
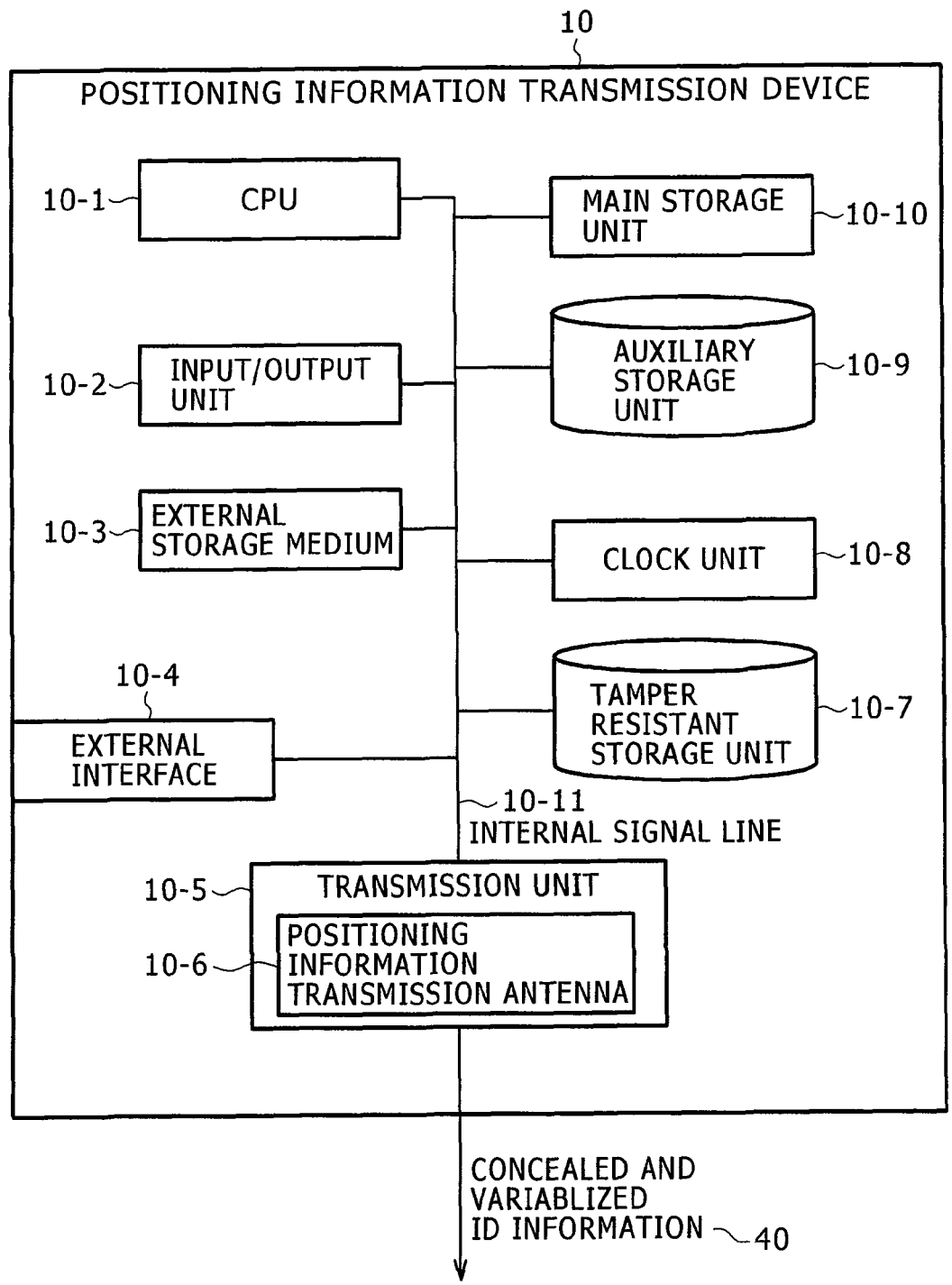
FIG. 2 illustrates by example a hardware configuration of a positioning information transmission device 10.

FIG. 2 shows a hardware configuration of the positioning information transmission device 10. The positioning information transmission device 10 has a CPU 10-1, an input/output unit 10-2, an external storage medium 10-3, an external interface 10-4, a transmission unit 10-5, a positioning information transmission antenna 10-6, a tamper resistant storage unit 10-7, a clock unit 10-8, an auxiliary storage unit 10-9, and a main storage unit 10-10, coupled with each other with an internal signal line 10-11 such as a bus.

Figure 6:
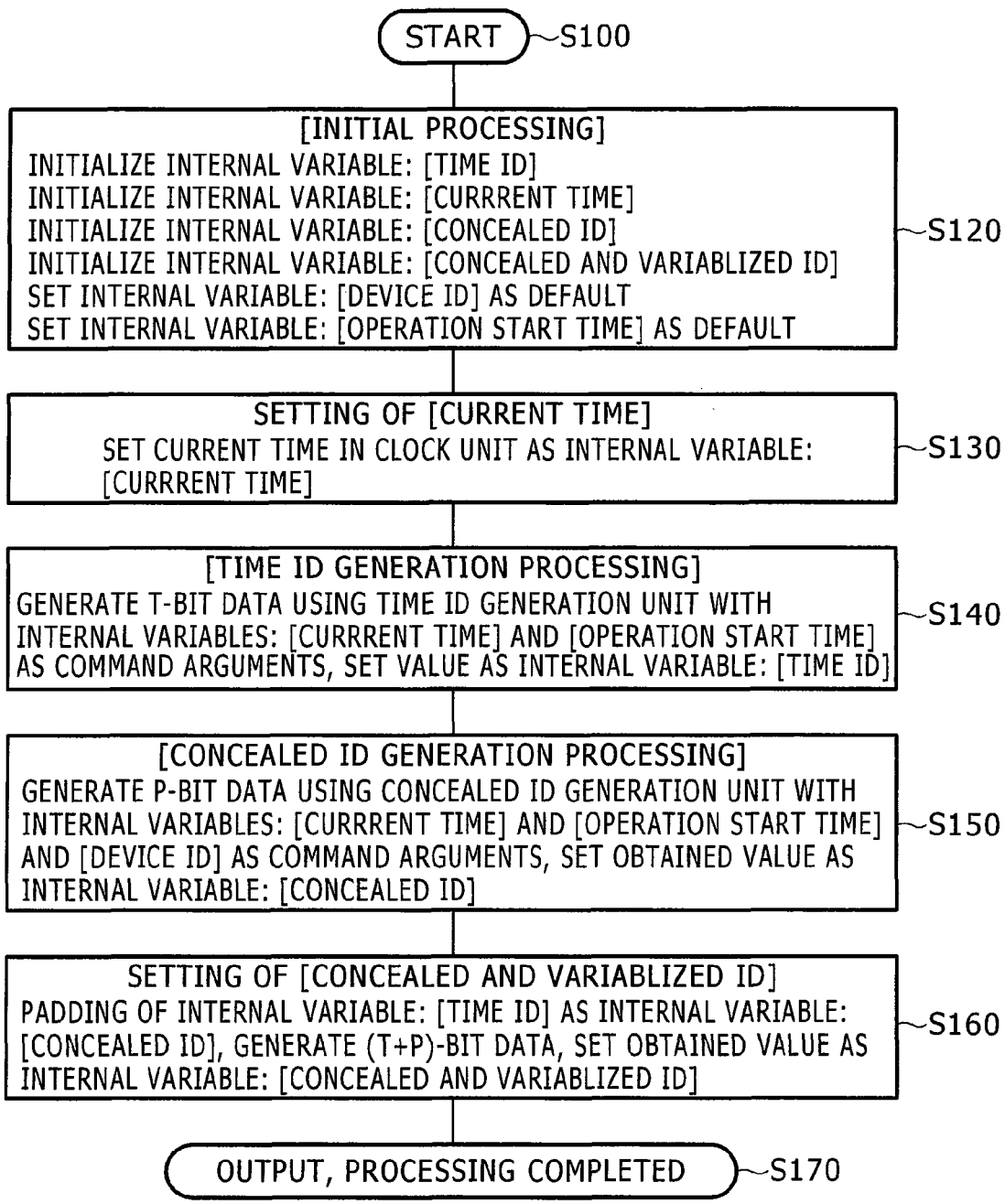
FIG. 6 illustrates by example a concealed and variablized ID generation processing (S100) flow in the positioning information transmission device 10.
Figure 7:
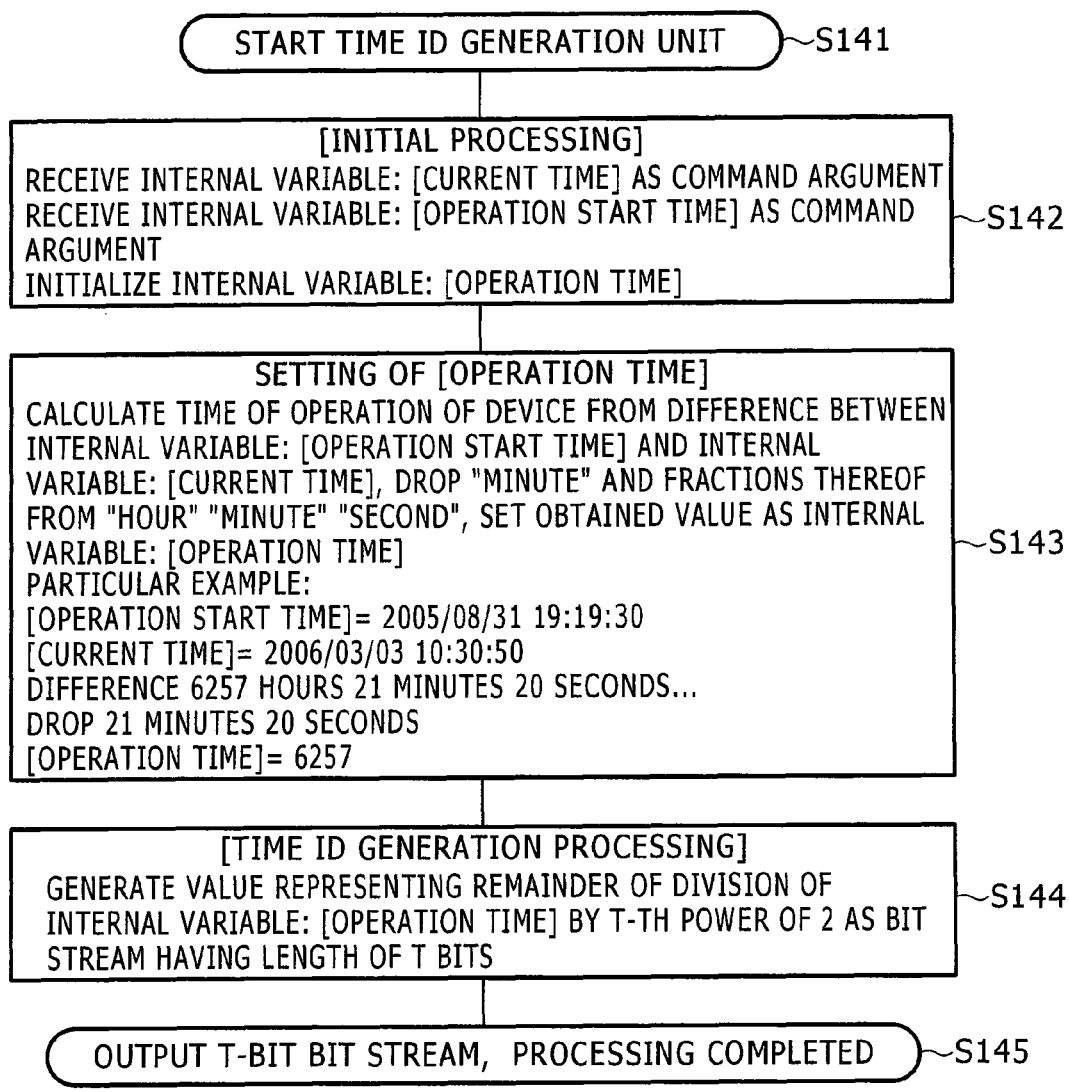
FIG. 7 illustrates by example a processing flow in a time ID generation unit.
Figure 8:
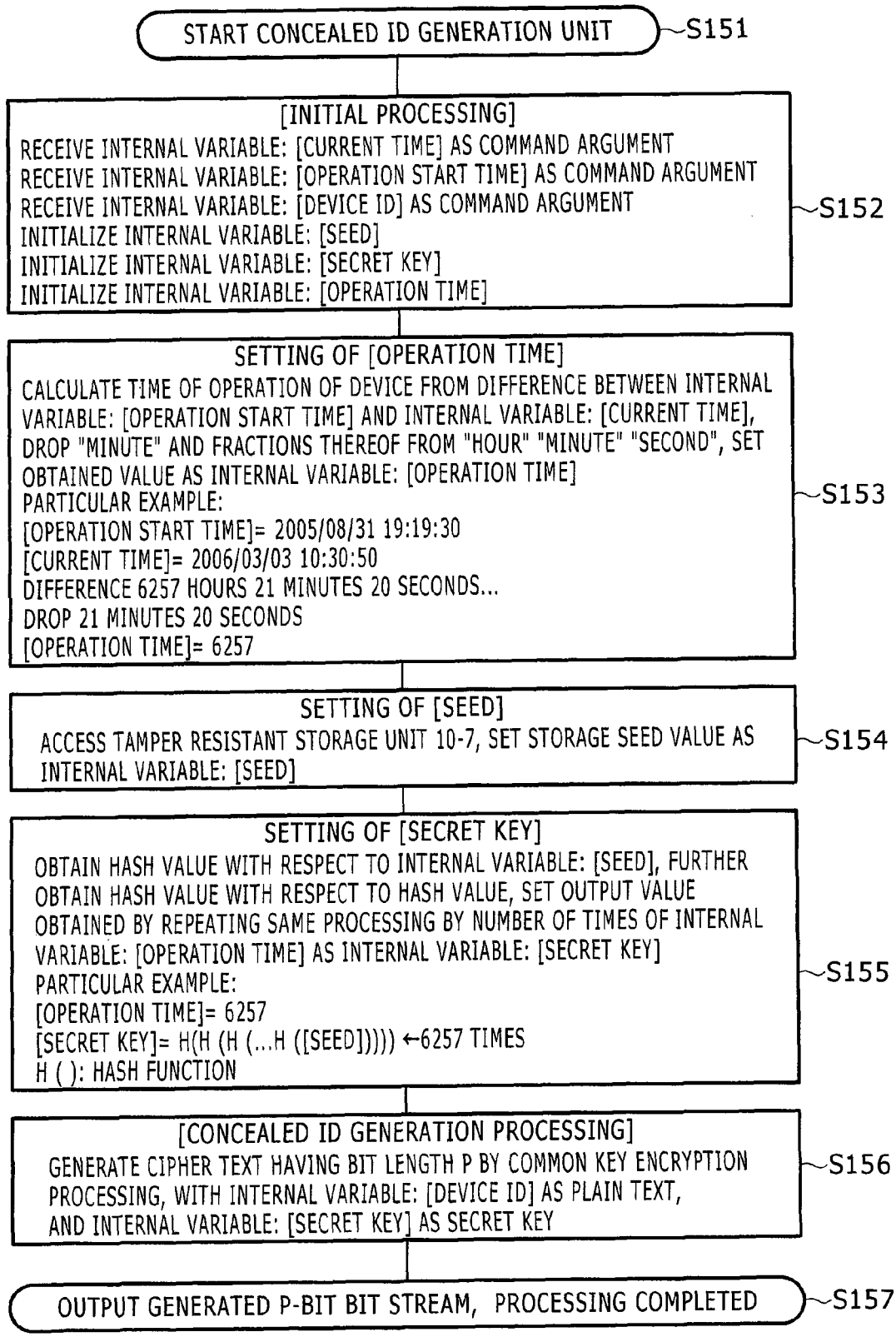
FIG. 8 illustrates by example a processing flow in a concealed ID generation unit.

Further, in the auxiliary storage unit 10-9, program code executed in FIGS. 6 to 8, an internal variable: [device ID] used in the program executed in FIGS. 6 and 8, and an internal variable: [operation start time] used in the program executed in FIGS. 7 and 8 are stored.

Further, in the tamper resistant storage unit 10-7, a seed value used in the program executed in FIG. 8 is stored.

Figure 3:
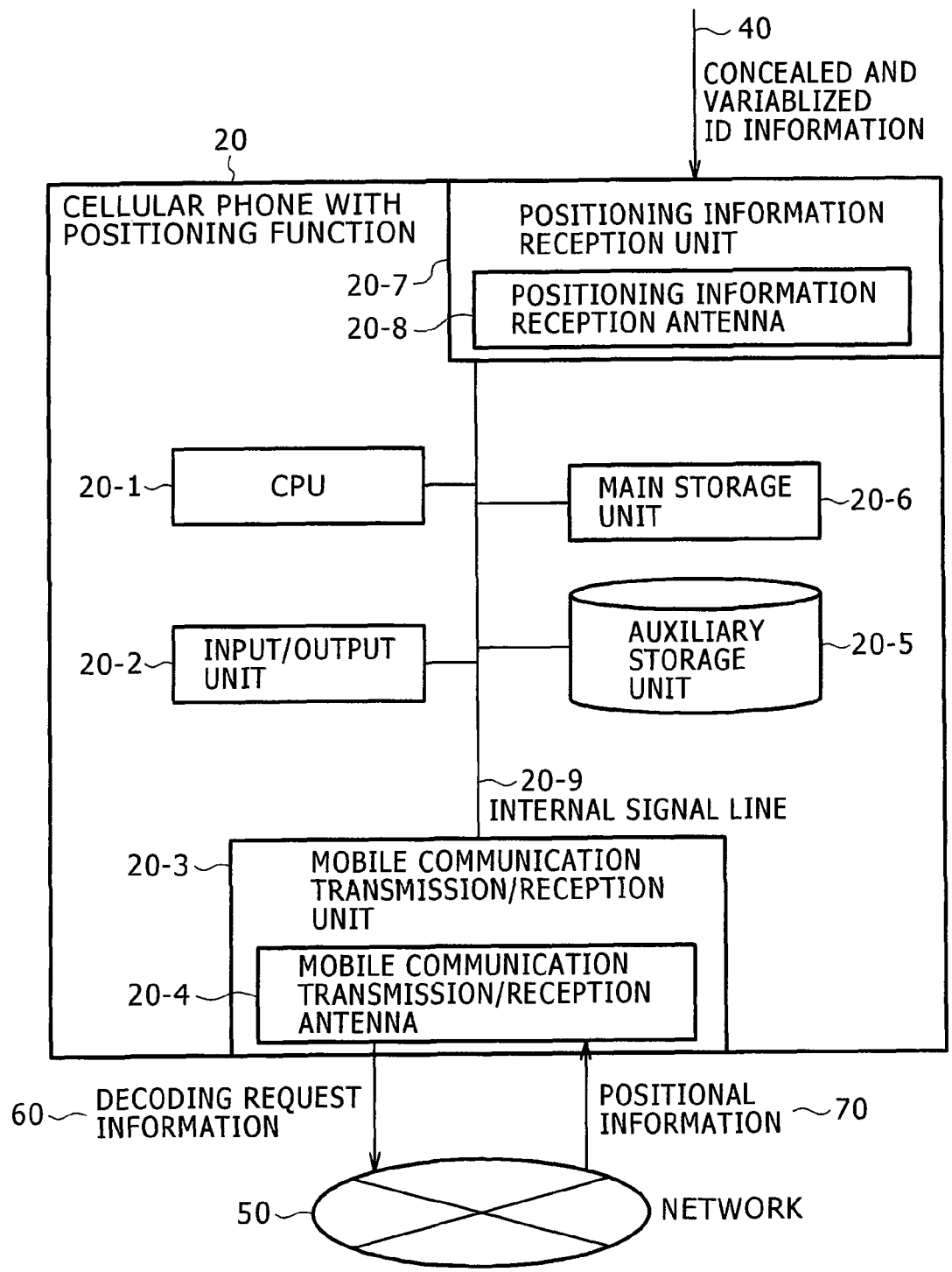
FIG. 3 illustrates by example a hardware configuration of a cellular phone 20 with positioning function.

FIG. 3 shows a hardware configuration of the cellular phone 20 with positioning function. The cellular phone 20 with positioning function has a CPU 20-1, an input/output unit 20-2, a mobile communication transmission/reception unit 20-3, a mobile communication transmission/reception antenna 20-4, an auxiliary storage unit 20-5, a main storage unit 20-6, a positioning information reception unit 20-7, and a positioning information reception antenna 20-8, coupled with each other with an internal signal line 20-9 such as a bus.

Figure 4:
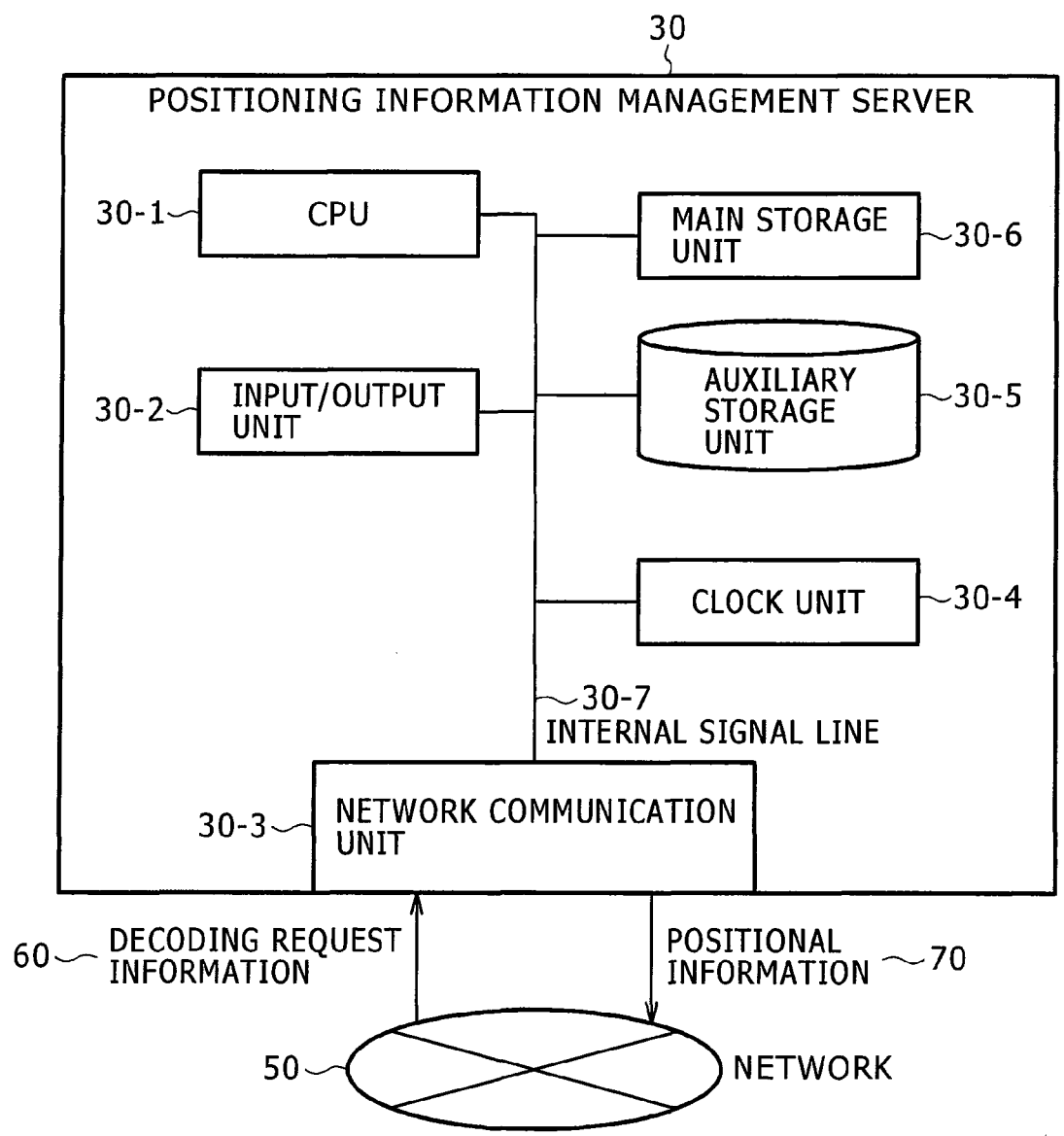
FIG. 4 illustrates by example a hardware configuration of a positioning information management server 30.

FIG. 4 shows a hardware configuration of the positioning information management server 30. The positioning information management server 30 has a CPU 30-1, an input/output unit 30-2, a network communication unit 30-3, a clock unit 30-4, an auxiliary storage unit 30-5, and a main storage unit 30-6, coupled with each other with an internal signal line 30-7 such as a bus.

Figure 12:
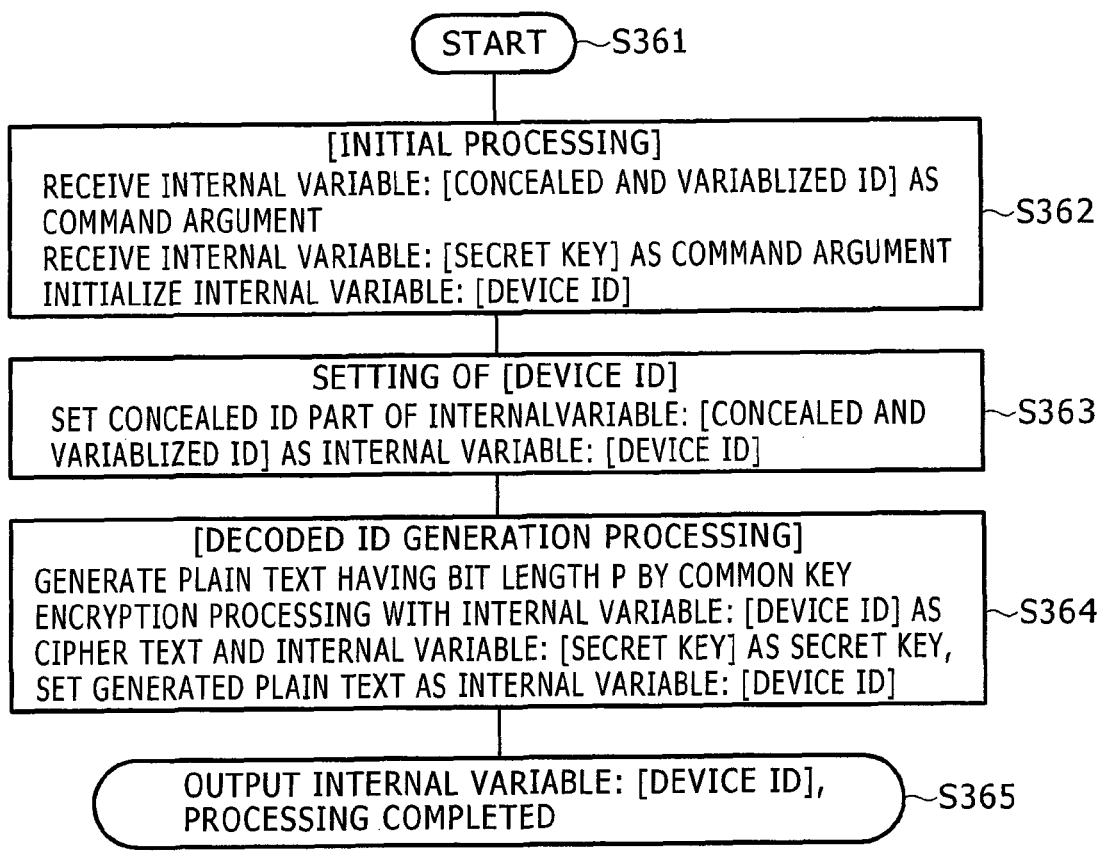
FIG. 12 illustrates by example a processing flow in a decoded ID generation unit of the positioning information management server 30.
Figure 13:
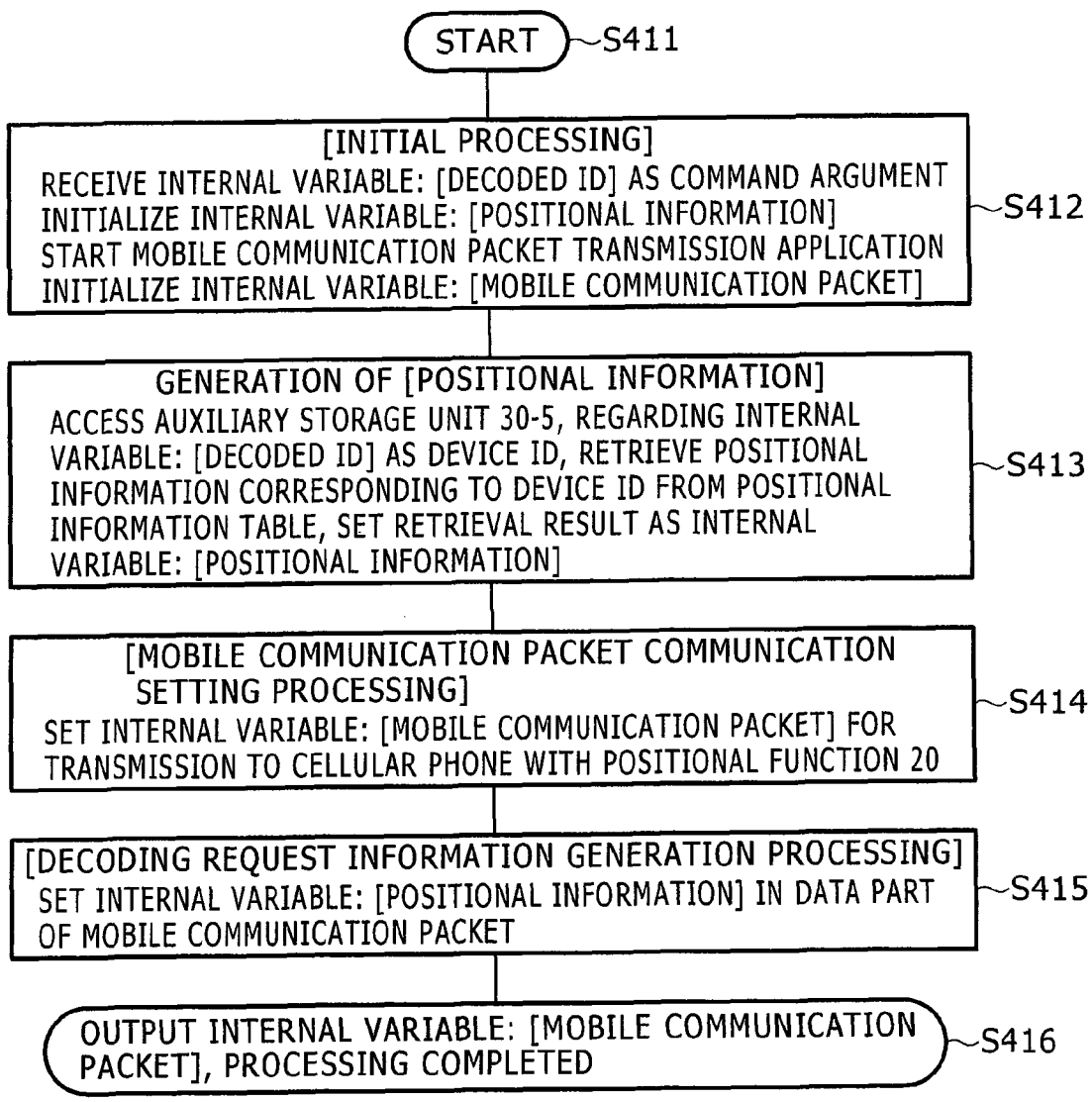
FIG. 13 illustrates by example a positional information generation processing (S410) flow in the positioning information management server 30.

Further, in the auxiliary storage unit 30-5, program code executed in FIGS. 10 to 13, an internal variable: [operation start time] used in the program executed in FIGS. 10 and 11, an internal variable: [seed] used in the program executed in FIG. 11, and a positional information table used in the program executed in FIG. 13 are stored.

Next, a processing flow in the respective devices and terminal in the present embodiment and the flow of various information generated and transmitted by the respective devices and terminal will be described using FIG. 5.

Figure 5:
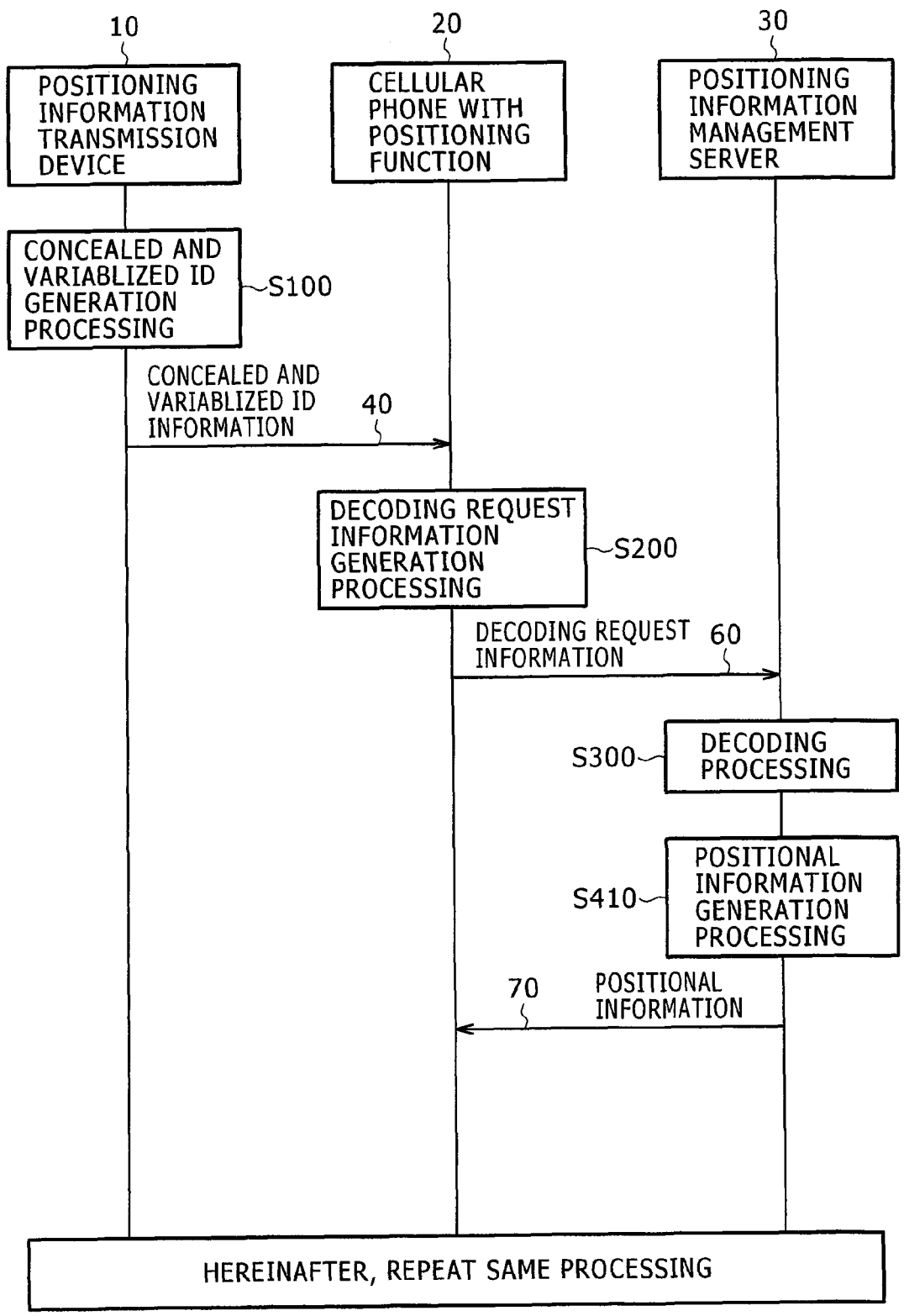
FIG. 5 illustrates by example a processing flow.

FIG. 5 shows a processing flow in the present positioning system.

The positioning information transmission device 10 performs concealed and variablized ID generation processing (S100) on its device ID to generate a concealed and variablized ID, and transmits the generated concealed and variablized ID as concealed and variablized ID information 40 to the cellular phone 20 with positioning function. The cellular phone 20 with positioning function performs decoding request information generation processing (S200) on the received concealed and variablized ID information 40 to generate decoding request information 60, and transmits the generated decoding request information 60 to the positioning information management server 30.

The positioning information management server 30 performs decoding processing (S300) on the received decoding request information 60 to decode the concealed device ID, then, performs positional information generation processing (S410) to generate positional information 70 corresponding to the device ID, and transmits the generated positional information 70 to the cellular phone 20 with positioning function. Thereafter, the positioning information transmission device 10 repeats the concealed and variablized ID generation processing (S100) and transmission of the generated concealed and variablized ID information 40. Each time the cellular phone 20 with positioning function receives the concealed and variablized ID information 40 and transmits the decoding request information 60 to the positioning information management server 30, the positioning information management server 30 repeats the decoding processing (S300), the positional information generation processing (S410) and transmission of the generated positional information 70 to the cellular phone 20 with positioning function.

Next, the details of generation processing of the concealed and variablized ID information 40 (S100 in FIG. 5) transmitted from the positioning information transmission device 10 in the present embodiment will be described using FIGS. 6 to 8. The processing flow described below is realized by loading the plural programs stored in the auxiliary storage unit 10-9 of the positioning information transmission device 10 to the main storage unit 10-10 and by executing the programs by the CPU 10-1.

FIG. 6 shows the concealed and variablized ID generation processing (S100) flow in the positioning information transmission device 10. Hereinbelow, the processing flow will be described.

The positioning information transmission device 10
initializes an internal variable: [time ID],
initializes an internal variable: [current time],
initializes an internal variable: [concealed ID],
initializes an internal variable: [concealed and variablized ID],
sets the internal variable: [device ID] as a device specific default value, and
sets the internal variable: [operation start time] as a common default value for all the devices (steps S110 and S120).

Next, the positioning information transmission device 10 sets current time outputted from the clock unit 10-8 as the internal variable: [current time] (S130).

Next, the positioning information transmission device 10 generates data having a bit length T using a time ID generation unit with the internal variables: [current time] and [operation start time] as command arguments, and sets the value as the internal variable: [time ID] (step S140).

Next, the positioning information transmission device 10 generates data having a bit length P using a concealed ID generation unit with the internal variables: [current time],

[operation start time] and [device ID] as command arguments, and sets the value as the internal variable: [concealed ID] (step S150).

Next, the positioning information transmission device 10 performs padding on the internal variable: [concealed ID] and the internal variable: [time ID] to generate data having a bit length T+P, then sets the value as the internal variable: [concealed and variablized ID], and outputs the internal variable: [concealed and variablized ID] as concealed and variablized ID information 40. Then the processing is completed (steps S160 and S170).

FIG. 7 is a processing flow in the time ID generation unit called in the concealed and variablized ID generation processing (S100) by the positioning information transmission device 10. Hereinbelow, the processing flow will be described.

The positioning information transmission device 10 receives the internal variable: [current time] as a command argument, receives the internal variable: [operation start time] as a command argument, and initializes an internal variable: [operation time] (steps S141 and S142).

Next, the positioning information transmission device 10 calculates time of operation of the device from a difference between the internal variable: [operation start time] and the internal variable: [current time], drops "minute" and its fractions from the calculated "hour" "minute" and "second" value, and sets the value as the internal variable: [operation time].

In the particular example of the figure showing [operation start time]=2005/08/31 19:19:30, and [current time]=2006/03/03 10:30:50, the obtained difference time is 6257 hours 21 minutes and 20 seconds. Then 21 minutes and 20 seconds are dropped, and the obtained value is set as the [operation time] =6257 (step S143).

Next, the positioning information transmission device 10 outputs a value, representing a remainder of division of the internal variable: [operation time] by the T-th power of 2, as a bit stream having a length of T bits. Then the processing is completed (steps S144 and S145).

FIG. 8 is a processing flow in the concealed ID generation unit called in the concealed and variablized ID generation processing (S100) by the positioning information transmission device 10. Hereinbelow, the processing flow will be described.

The positioning information transmission device 10
receives the internal variable: [current time] as a command argument,
receives the internal variable: [operation start time] as a command argument,
receives the internal variable: [device ID] as a command argument,
initializes the internal variable: [seed],
initializes an internal variable: [secret key], and
initializes the internal variable: [operation time] (steps S151 and S152).

Next, the positioning information transmission device 10 calculates time of operation of the device from a difference between the internal variable: [operation start time] and the internal variable: [current time], drops "minute" and its fractions from the calculated "hour" "minute" and "second" value, and sets the value as the internal variable: [operation time] (step S153).

In the particular example of the figure showing [operation start time]=2005/08/31 19:19:30, and [current time]=2006/03/03 10:30:50, the obtained difference time is 6257 hours 21 minutes and 20 seconds. Then 21 minutes and 20 seconds are dropped, and the obtained value is set as the [operation time] =6257 (step S153).

Next, the positioning information transmission device 10 accesses a tamper resistant storage unit 10-7, and sets the stored seed value as the internal variable: [seed] (step S154).

Next, the positioning information transmission device 10 calculates a hash value with respect to the internal variable: [seed],
further calculates a hash value with respect to the hash value, and
sets an output value, obtained by repeating the same operation by the number of times of the internal variable: [operation time], as the internal variable: [secret key].

In the particular example of the figure shows the [operation time]=6257 and the [secret key]=H(H(H( ... H([seed]))))
←6257 times
(Note that H( ) hash function) (step S155).

Next, the positioning information transmission device 10 generates cipher text having a bit length P by common key encryption processing with the internal variable: [device ID] as plain text, and the internal variable: [secret key] as a secret key, and outputs the cipher text having the bit length P. Then the processing is completed (steps S156 and S157).

Next, the details of the flow of generation processing of the decoding request information 60 transmitted by the cellular phone 20 with positioning function in the present embodiment will be described using FIG. 9.

The processing flow described below is realized by loading the plural programs stored in the auxiliary storage unit 20-5 of the cellular phone 20 with positioning function to the main storage unit 20-6 and by executing the programs by the CPU 20-1.

Hereinbelow, the processing flow will be described.

The cellular phone 20 with positioning function starts a mobile communication packet transmission application, and initializes an internal variable: [mobile communication packet] (steps S210 and S220).

Next, the cellular phone 20 with positioning function sets the internal variable: [mobile communication packet] for positioning information management server transmission (step S230).

Next, the cellular phone 20 with positioning function sets the received concealed and variablized ID information 40 in a data part of the mobile communication packet, and
outputs the internal variable: [mobile communication packet] as the decoding request information 60. Then the processing is completed (steps S240 and S250).

Next, the details of the decoding processing (step S300 in FIG. 5) performed by the positioning information management server 30 in the present embodiment will be described using FIGS. 10 to 12. The processing flow described below is realized by loading the plural programs stored in the auxiliary storage unit 30-5 of the positioning information management server 30 to the main storage unit 30-6 and by executing the programs by the CPU 30-1.

FIG. 10 is the flow of the decoding processing (step S300) in the positioning information management server 30. Hereinbelow, the processing flow will be described.

The positioning information management server 30
initializes the internal variable: [concealed and variablized ID],
initializes an internal variable: [decoded ID],
initializes the internal variable: [current time],
initializes the internal variable: [secret key], and
sets the internal variable: [operation start time] as a common default value for all the devices (steps S310 and S320).

Next, the positioning information management server 30 sets the concealed and variablized ID information as a data part of the received decoding request information 60 as the internal variable: [concealed and variablized ID] (step S330).

Next, the positioning information management server 30 sets current time outputted from the clock unit 30-4 as the internal variable: [current time] (step S340).

Next, the positioning information management server 30 specifies a secret key used in encryption using a secret key inference unit with the internal variable: [current time], the internal variable: [operation start time] and the internal variable: [concealed and variablized ID] as command arguments, and sets the specified secret key as the internal variable: [secret key] (step S350).

Next, the positioning information management server 30 decodes the device ID encrypted in the concealed and variablized ID generation processing (S100) using a decoded ID generation unit with the internal variable: [concealed and variablized ID] and the internal variable: [secret key] as command arguments, sets the decoded value as the internal variable: [decoded ID], and outputs the internal variable: [decoded ID] as a decoded ID. Then the processing is completed (steps S360 and S370).

FIG. 11 is a processing flow in the secret key inference unit called in the decoding processing (S300) by the positioning information management server 30. Hereinbelow, the processing flow will be described.

The positioning information management server 30 receives the internal variable: [concealed and variablized ID] as a command argument, receives the internal variable: [current time] as a command argument, receives the internal variable: [operation start time] as a command argument, initializes the internal variable: [seed], initializes the internal variable: [operation time], initializes an internal variable: [inference key], and initializes an internal variable: [inference times] (steps S351 and S352).

Next, the positioning information management server 30 calculates time of operation of the device from a difference between the internal variable: [operation start time] and the internal variable: [current time], drops "minute" and its fractions from the calculated "hour" "minute" and "second" value, and sets the value as the internal variable: [operation time] (step S353).

Next, the positioning information management server 30 accesses the auxiliary storage unit 30-5, and sets the stored seed value as the internal variable: [seed] (step S354).

Next, the positioning information management server 30 sets a value within the range of $\pm\{(T-1)\text{th power of } 2\}$ with respect to the internal variable: [operation time], having a remainder of division by the T-th power of 2 corresponding with time ID of the internal variable: [concealed and variablized ID], as the internal variable: [inference times] (step S355).

Next, the positioning information management server 30 calculates a hash value with respect to the internal variable: [seed], further calculates a hash value with respect to the hash value, sets an output value, obtained by repeating the same processing by the value of the internal variable: [inference times], as the internal variable: [inference key], and with the internal variable: [inference key] as the secret key used in the concealed and variablized ID generation processing, outputs as the internal variable: [inference key]. Then the processing is completed (steps S356 and S357).

FIG. 12 is a processing flow in a decoded ID generation unit called in the decoding processing (S300) by the positioning information management server 30. Hereinbelow, the processing flow will be described.

The positioning information management server 30 receives the internal variable: [concealed and variablized ID] as a command argument, receives the internal variable: [secret key] as a command argument, and initializes the internal variable: [device ID] (steps S361 and S362).

Next, the positioning information management server 30 sets a concealed ID part of the internal variable: [concealed and variablized ID] as the internal variable: [device ID] (step S363).

Next, the positioning information management server 30 generates plain text having a bit length P by the common key encryption processing with the internal variable: [device ID] as cipher text and the internal variable: [secret key] as a secret key, sets the generated plain text as the internal variable: [device ID], and outputs the internal variable: [device ID] as the decoded ID. Then the processing is completed (steps S364 and S365).

Next, the details of the positioning information generation processing (step S410 in FIG. 5) performed by the positioning information management server 30 in the present embodiment will be described using FIG. 13. The processing described below is realized by loading the plural programs stored in the auxiliary storage unit 30-5 of the positioning information management server 30 to the main storage unit 30-6 and by executing the programs by the CPU 30-1.

The positioning information management server 30 receives the internal variable: [decoded ID] as a command argument, initializes an internal variable: [positional information], starts the mobile communication packet transmission application, and initializes the internal variable: [mobile communication packet] (steps S411 and S412).

Next, the positioning information management server 30 accesses the auxiliary storage unit 30-5, with the internal variable: [decoded ID] as a device ID, then retrieves positional information corresponding to the device ID from the positional information table (D300), and sets the result of retrieval as the internal variable: [positional information] (step S413).

Next, the positioning information management server 30 sets the internal variable: [mobile communication packet] for transmission to the cellular phone 20 with positioning function (step S414).

Next, the positioning information management server 30 sets the internal variable: [positional information] in a data part of the mobile communication packet, and outputs the internal variable: [mobile communication packet] as the positional information 70. Then the processing is completed (steps S415 and S416).

Next, an example of the positional information table (D300) stored in the auxiliary storage unit 30-5 of the positioning information management server 30 will be described using FIG. 14.

FIG. 14, in which a positioning information transmission device having a device ID: 1234 is installed at a latitude of XX, a longitude of YY, and a height of ZZ, and a positioning information transmission device having a device ID: 5678 is installed at a latitude of xx, a longitude of yy and a height of zz, shows the correspondence between the device IDs and device installation sites.

Note that the present invention is not limited to the above-described embodiment, but various modifications can be made within the scope of the subject matter.

For example, in FIGS. 5 to 8, the positioning information transmission device 10 performs the concealed and variablized ID generation processing using its internal CPU 10-1. However, it may be arranged such that the positioning information management server 30 previously performs the concealed and variablized ID generation processing on all the positioning information transmission devices, stores the generated concealed and variablized IDs in the auxiliary storage unit 10-9 or the tamper resistant storage unit 10-7 from the external interface 10-4 of the positioning information transmission device 10, and in generation of the concealed and variablized ID information 40, sequentially accesses the auxiliary storage unit 10-9 or the tamper resistant storage unit 10-7 to obtain the concealed and variablized ID. Further, it may be arranged such that the positioning information management server 30 holds previously-calculated correspondence information between concealed and variablized ID and device ID, thereby obtains the device ID without the decoding processing in FIGS. 10 to 12. Further, it may be arranged such that the positioning information management server 30 generates a (T+P)-bit pseudo random number for all the positioning information transmission devices 10 in place of generation of concealed and variablized ID and uses the generated respective pseudo random numbers as the concealed and variablized IDs. Note that in this case, since different positioning information transmission devices do not transmit the same concealed and variablized ID within time of $2^{(T-1)}$, regarding the respective pseudo random numbers supplied to the positioning information transmission devices 10, different pseudo random numbers are supplied in the time of $\pm 2^{(T-1)}$. Next, a particular example of supply of pseudo random number will be described using FIG. 15.

In FIG. 15, for example, a pseudo random number: abc is supplied to a positioning information transmission device having a device ID: 3 in operation time: 5. At this time, within the time of $\pm 2^{(T-1)}$ (T=2 in FIG. 15), the pseudo random number: abc is not supplied to the other positioning information transmission devices. With this arrangement, when the positioning information management server 30 receives the concealed and variablized ID: abc between operation time 3 to operation time 7, the information management server 30 can obtain the device ID: 3 from the concealed and variablized ID: abc.

In this case, it is not necessary to store the device ID in the auxiliary storage unit 10-9 or the tamper resistant storage unit 10-7 of the positioning information transmission device 10.

Further, in FIG. 8, the positioning information transmission device 10 performs the setting of the internal variable: [secret key] (S155) every time the concealed ID generation unit is executed. It may be arranged such that, the setting of the internal variable: [secret key] is performed once, then the value of the internal variable: [secret key] and the value of the internal variable: [operation time] are stored in the auxiliary storage unit 10-9 or the main storage unit 10-10, then in setting of the internal variable: [secret key] next time, when the set internal variable: [operation time] corresponds with the stored value of the internal variable: [operation time], the stored value of the internal variable: [secret key] is read as the internal variable: [secret key] and used again without setting of the internal variable: [secret key].

Further, in FIG. 11, the positioning information management server 30 performs the setting of the internal variable: [inference key] (S356) every time the secret key inference unit is executed. It may be arranged such that the setting of the internal variable: [inference key] is performed once, then the value of the internal variable: [inference key] and the value of the internal variable: [inference times] are stored in the auxiliary storage unit 30-5 or the main storage unit 30-6, then, in setting of the internal variable: [inference key] next time, when the set internal variable: [inference times] corresponds with the stored value of the internal variable: [inference times], the stored value of the internal variable: [inference key] is read as the internal variable: [inference key] and used again without setting of the internal variable: [inference key].

Further, in the above-described embodiment, the concealed and variablized ID is changed every hour; however, the timing of the changing is not limited to 1 hour but may be arbitrary time. Especially, when all the devices can be synchronized with each other, the changing of the concealed and variablized ID may be performed at odd intervals in a status where all the devices are synchronized.

Further, in the above-described embodiment, stream encryption is used as a common key encryption algorithm; however, another encryption algorithm may be used.

Further, in FIG. 8, in the processing flow in the concealed ID generation unit, in setting of the internal variable: [secret key], the positioning information transmission device 10 sets a value, obtained by calculating a hash value by the number of times corresponding to current time with respect to the internal variable: [seed], as the internal variable: [secret key] (S155); however, it is not necessary to set the internal variable: [secret key] in the above-described manner. It may be arranged such that random number generators in synchronization are provided in all the devices, all the random number generator generate the same random number at the same time, and the generated random number is set as the internal variable: [secret key], thereby all the devices have the same internal variable: [secret key] at the same time.

Further, in FIGS. 7 and 8, the positioning information transmission device 10 performs the setting of the internal variable: [operation time] (S143 and S153). It may be arranged such that the value of the internal variable: [operation time] set in FIG. 7 is stored in the auxiliary storage unit 10-9 or the main storage unit 10-10, then in setting of the internal variable: [operation time] in FIG. 8, the stored value of the internal variable: [operation time] is read and used again as the value of the internal variable: [operation time].

What is claimed is:

1. A positioning information system including:
   a plurality of positioning information transmission devices, installed in a region having a predetermined extent, each of which transmits unique positioning identification information;
   a mobile communication terminal with positioning function having a mobile communication radio communication unit to receive the transmitted positioning identification information and transmit the received positioning identification information as mobile communication radio information; and
   a positioning information management server configured to read the positioning identification information from the transmitted mobile communication radio information, convert the positioning identification information into position identification information representing a predetermined installation point, and return the converted position identification information as mobile communication radio information to the mobile communication terminal with positioning function, allocate a unique position identification information to the predetermined installation point, wherein transmission device fixed identification information is allocated to the positioning information transmission device, wherein the positioning information transmission device is configured to hold the transmission device fixed identification information, and transmit the positioning identification information corresponding to the transmission device fixed identification information, wherein the positioning information management server is configured to use a position identification information correspondence table describing correspondence between the transmission device fixed identification information of the positioning information transmission device and the position identification information, read concealed variable identification information and concealed key identification information from the positioning identification information received from the positioning information transmission device, perform decoding processing on the concealed variable identification information using the read concealed key identification information, decode the transmission device-specific transmission device fixed identification information, make retrieval in the position identification information correspondence table, and perform conversion to the position identification information linked to the decoded transmission device fixed identification information, wherein the positioning information transmission device is further configured to repeat generation and transmission of the positioning identification information, and wherein the positioning information management server is further configured to repeat decoding of the transmitted positioning identification information.

2. The positioning information system according to claim 1, wherein the positioning identification information is generated by executing concealment processing on the predetermined transmission device fixed identification information, to conceal the transmission device fixed identification information of the device itself, generating concealed variable identification information, and generating concealed key identification information with respect to the concealment processing, so as to include the concealed variable identification information and the concealed key identification information.

3. The positioning information system according to claim 2, wherein the concealed variable identification information is cipher text calculated with a common key encryption function, with a hash value, calculated by repeating inputting secret key generation seed information stored in the positioning information transmission device into a hash function to calculate a hash value and further inputting the calculated hash value into the hash function to calculate a hash value, as a secret key, and with the transmission device-specific transmission device fixed identification information as plain text, and wherein the number of times of repeated hash value calculation with respect to the secret key generation seed information is a quotient upon division of operation time as a difference between actuation start time to actuate and start operation of the positioning information transmission device and current time by a predetermined first time interval.

4. The positioning information system according to claim 3, wherein the concealed key identification information is a remainder upon division of a quotient, upon division of the operation time as the difference between the actuation start time to actuate and start operation of the positioning information transmission device and the current time by the predetermined first time interval, by a predetermined second interval, wherein the secret key generation seed information is common information for all the positioning information transmission devices installed in the region having the predetermined extent and the positioning information management server, and wherein the actuation start time is common information for all the positioning information transmission devices installed in the region having the predetermined extent and the positioning information management server.

5. The positioning information system according to claim 4, wherein the decoding processing on the concealed variable identification information is processing of generating plain text calculated with the common key encryption function, with a hash value calculated by repeating inputting the secret key generation seed information stored in the positioning information management server into the hash function to calculate a hash value and further inputting the calculated hash value into the hash function to calculate a hash value, as a secret key, and with the concealed variable identification information as cipher text, and wherein the number of times of repeated hash value calculation with respect to the secret key generation seed information is a value obtained by calculating a quotient upon division of a quotient, upon division of the operation time as the difference between the actuation start time stored in the positioning information management server and the current time by the predetermined first time interval, by a predetermined second time interval, then calculating a product between the calculated quotient and the second time interval, and adding the concealed key identification information to the calculated product.

6. The positioning information system according to claim 1, wherein the concealed variable identification information is cipher text calculated with the common key encryption function, with a bit stream, obtained by generating a random number having a predetermined bit length, with a quotient upon division of operation time as a difference between actuation start time to actuate and start operation of the positioning information transmission device and current time by a predetermined first time interval, as an input, using a random number generator held in the positioning information transmission device, as the secret key, and with the transmission device-specific transmission device fixed identification information as plain text.

7. The positioning information system according to claim 6, wherein the concealed key identification information is a remainder upon division of a quotient, upon division of the operation time as the difference between the actuation start time to actuate and start operation of the positioning information transmission device and the current time by the predetermined first time interval, by a predetermined second time interval, and wherein the actuation start time is common information for all the positioning information transmission devices installed in the region having the predetermined extent and the positioning information management server.

8. The positioning information system according to claim 7, wherein the decoding processing on the concealed variable identification information is processing of generating plain text calculated with the common key encryption function, with a bit stream, obtained by generating a random number having a predetermined bit length with a value, obtained by calculating a quotient upon division of a quotient, upon division of the operation time as the difference between the actuation start time held in the positioning information management server and the current time by the predetermined first time interval, by the second time interval, and calculating a product between the calculated quotient and the second time interval, and adding the concealed key identification information to the calculated product, as an input, using a random number generator held in the positioning information management server, as the secret key, and with the concealed variable identification information as the cipher text.

9. The positioning information system according to claim 1, wherein the positioning identification information is, prior to actuation and start of operation of the positioning information transmission device, calculated by the positioning information management server by performing the concealment processing on the predetermined transmission device fixed identification information, and stored in the device having the transmission device fixed identification information.

* * * * *